US009957385B2

(12) United States Patent
Brizzolara et al.

(10) Patent No.: US 9,957,385 B2
(45) Date of Patent: *May 1, 2018

(54) PLASTICIZER-FREE ARTICLE MADE OF PVC GRAFT COPOLYMERS

(71) Applicant: VESTOLIT GmbH & Co. KG, Marl (DE)

(72) Inventors: Davide Brizzolara, Herten (DE); Ingo Fischer, Marl (DE); Jan-Stephan Gehrke, Haltern am See (DE); Dieter Polte, Schermbeck (DE); Axel Stieneker, Münster (DE); Harald Sturm, Dorsten (DE)

(73) Assignee: VESTOLIT GmbH & Co. KG, Marl (DE)

( * ) Notice: Subject to any disclaimer, the term of this patent is extended or adjusted under 35 U.S.C. 154(b) by 304 days.

This patent is subject to a terminal disclaimer.

(21) Appl. No.: 14/767,259

(22) PCT Filed: Feb. 11, 2013

(86) PCT No.: PCT/EP2013/052657
§ 371 (c)(1),
(2) Date: Nov. 30, 2015

(87) PCT Pub. No.: WO2014/121852
PCT Pub. Date: Aug. 14, 2014

(65) Prior Publication Data
US 2016/0075870 A1    Mar. 17, 2016

(51) Int. Cl.
*C08L 51/00*    (2006.01)
*C08F 265/04*    (2006.01)
*C08J 3/00*    (2006.01)

(52) U.S. Cl.
CPC .......... *C08L 51/003* (2013.01); *C08F 265/04* (2013.01); *C08J 3/005* (2013.01); *C08J 2351/00* (2013.01); *C08J 2451/00* (2013.01); *C08L 2201/10* (2013.01); *C08L 2203/16* (2013.01); *C08L 2205/025* (2013.01); *C08L 2207/53* (2013.01)

(58) Field of Classification Search
CPC .............. C08J 2351/00; C08L 2207/53; C08L 2205/025
See application file for complete search history.

(56) References Cited

U.S. PATENT DOCUMENTS

| | | | |
|---|---|---|---|
| 5,614,049 A | 3/1997 | Kohlhammer et al. | |
| 6,583,221 B1 * | 6/2003 | Omura .................. | C08F 265/04 525/64 |
| 2007/0149713 A1 | 6/2007 | Kuwahata et al. | |
| 2016/0075811 A1 | 3/2016 | Brizzolara et al. | |
| 2016/0075812 A1 | 3/2016 | Brizzolara et al. | |

FOREIGN PATENT DOCUMENTS

| | | |
|---|---|---|
| CA | 2900843 A1 | 8/2014 |
| CA | 2907442 A1 | 8/2014 |
| CA | 2907479 A1 | 8/2014 |
| CN | 105229037 A | 1/2016 |
| CN | 105246921 A | 1/2016 |
| CN | 105246969 A | 1/2016 |
| DE | 2123384 A1 | 11/1972 |
| DE | 3803036 A1 | 8/1989 |
| DE | 4338374 A1 | 5/1995 |
| DE | 10121580 A1 | 11/2002 |
| EP | 0313507 A2 | 4/1989 |
| EP | 0472852 B1 | 3/1992 |
| EP | 0590659 A1 | 4/1994 |
| EP | 0647663 B1 | 4/1995 |
| EP | 2067795 A1 | 6/2009 |
| EP | 2953980 A1 | 12/2015 |
| EP | 2953981 A1 | 12/2015 |
| EP | 2954007 A1 | 12/2015 |
| GB | 1530854 A | 11/1978 |
| JP | 2003253082 A | 9/2003 |
| JP | 2016507621 A | 3/2016 |
| JP | 2016510074 A | 4/2016 |
| RU | 2021292 C1 | 10/1994 |
| RU | 2274647 C2 | 4/2006 |
| SU | 481160 A3 | 8/1975 |
| WO | 2014121850 A1 | 8/2014 |
| WO | 2014121851 A1 | 8/2014 |
| WO | 2014121852 A1 | 8/2014 |

OTHER PUBLICATIONS

Domininghaus-Kunststoffe, 7th revised and extended edition, 2008, chapter 2.1.2.2.1 Erhohung der Schlagzahigkeit, Polyacrylate als Modifizierungsmittel fur transparente PVC-Artikel, p. 372 (with English translation of p. 372).
F.P. Reding et al., Glass transition and melting point of poly(vinyl chloride), Journal of Polymer Science, Vo.. 56, No. 163, Jan. 1, 1962, pp. 225-231.
International Preliminary Report on Patentability issued in PCT/EP2013/052655, completed Jul. 2, 2015, 23 pages.
International Preliminary Report on Patentability issued in PCT/EP2013/052656, completed Jul. 20, 2015, 14 pages.
International Preliminary Report on Patentability issued in PCT/EP2013/052657, completed Apr. 20, 2015, 10 pages.
International Search Report issued in PCT/EP2013/052655, dated Oct. 18, 2013, 5 pages.
International Search Report issued in PCT/EP2013/052656, dated Oct. 18, 2013, 4 pages.
International Search Report issued in PCT/EP2013/052657, dated Oct. 25, 2013, 4 pages.
Wilkes et al., PCV-Handbook, 1st Edition, Chapter 1, p. 14, Hanser Gardner Publications (2005).

* cited by examiner

*Primary Examiner* — Mark S Kaucher
(74) *Attorney, Agent, or Firm* — Faegre Baker Daniels LLP

(57) ABSTRACT

The invention relates to blends of vinyl chloride graft copolymers as well as to a method for preparing such vinyl chloride graft copolymers and their blends. The invention also relates to molded articles manufactured by using the blends according to the invention.

20 Claims, No Drawings

PLASTICIZER-FREE ARTICLE MADE OF PVC GRAFT COPOLYMERS

The invention relates to blends of vinyl chloride graft copolymers and to a method for preparing such vinyl chloride graft copolymers and their blends. The invention also relates to molded articles manufactured using the blends according to the invention.

Plasticized polyvinyl chloride (PVC) does not belong to the group of the thermoplastic elastomers (TPE), although it has TPE properties (PVC-Handbook, Charles E. Wilkes, James W. Summers, Charles Anthony Daniels—2005, page 14). Due to the low costs for the raw materials, the multifaceted processing properties and the good product features it takes a special position among the thermoplastic elastomers. Plasticized PVC shows very good stretchability and tensile strength due to the formation of microcrystallites and the dipole-dipole interactions between chlorine and hydrogen atoms. By varying the percentage of plasticizer in PVC the rigidity and flexibility of a product can be adjusted in a very easy manner. This has major logistic advantages for the fabricator, since he can produce a plurality of products from only a few ingredients. Only the migration ability of the low-molecular weight plasticizer has to be considered a disadvantage. Due to migration of the plasticizer the material embrittles, which leads to a degradation of the mechanical properties.

For many years, various oligomeric and polymeric plasticizers have been employed, which, due to their high molecular weights, show only little to none tendency to migrate (Domininghaus—Kunststoffe, $7^{th}$ revised and extended edition 2008). Known examples are copolymers consisting of ethylene-vinyl acetate-vinyl chloride (EVA-VC), ethylene-vinyl acetate (EVA, Levapren®), acrylonitrile-butadiene (NBR), styrene-butadiene (SBR), ethylene-vinyl acetate-carbon monoxide (Elvaloy®), styrene-butadiene-styrene (SBS, Kraton®) etc. The high-molecular weight plasticizers are blended with PVC or grafted with PVC in a suspension polymerization process. These products are only used for special requirements (low-temperature flexibility, low migration, fat resistance, etc.), since otherwise the disadvantages will prevail, such as low plasticizing, more complex processing, inferior tear resistance, etc. To be considered a particularly serious drawback is the fact that molded articles, which were produced from a blend of PVC and the majority of polymeric plasticizers (elastomers), are opaque.

The PBA-g-PVC graft copolymers described in the prior art and prepared in emulsion or suspension processes can only be processed into translucent or opaque molded articles.

Cross-linked polyacrylic esters (PAE) may be employed to improve the notch impact strength of rigid PVC (EP 0472852). In DE 3803036 a suspension process is described which allows to obtain a PVC that contains 65 wt % of a cross-linked PAE. This product may be employed as an impact resistance modifier or as a polymeric plasticizer for PVC.

In EP 0647663 a method is described for producing thermoplastically elastomeric graft copolymerizates of PVC having cross-linked polyacrylates as a graft base. No information is provided concerning transparency or the particle sizes of the graft copolymerizates.

In DE 10121580 a process for preparing PVC having up to 80 wt % of elastomer is described. Said elastomer is a cross-linked poly(butyl acrylate) which is grafted by vinyl chloride in an emulsion polymerization. In a preferred embodiment, initially a cross-linked poly(butyl acrylate) latex is prepared having a particle size of 205 nm. In a second step, the cross-linked poly(butyl acrylate) latex is pre-charged into a reactor and grafted with vinyl chloride. The core-shell latex is precipitated and dried. Due to the precipitation, the modifier prepared in this way, having a residual content of vinyl chloride between 5 and 10 wt %, has the advantage that during processing suspension-PVC (S-PVC), having a content of about 10 wt % of the modifier according to the invention, a mass is formed that plastifies particularly fast. This advantage is only relevant for high-throughput extrusion of rigid PVC when only small amounts of the graft copolymer are employed in order to improve the notch impact strength.

In the prior art the only method known to us for producing transparent polyacrylic ester-modified PVC articles using methods such as extrusion, injection molding or calendering, the usage of graft copolymers is described which contain a certain percentage of polystyrene within the polyacrylate phase. Due to its higher refractive index ($n_D^{20}$=1.60), the content of polystyrene counterbalances the difference in the refractive indices of poly(butyl acrylate) and PVC (Domininghaus—Kunststoffe, $7^{th}$ revised and extended edition 2008, chapter 2.1.2.2.1 Erhöhung der Schlagzähigkeit— Polyacrylate als Modifizierungsmittel für transparente PVC-Artikel, page 372). Due to the high glass transition temperature of polystyrene, this principle is only suitable for rigid PVC since the content of polystyrene outweighs the plasticizing effect of polyacrylates. Moreover, the UV and weathering resistance of PVC articles is impaired owing to the content of polystyrene.

Thus, it is the task of the invention to provide materials based on vinyl chloride in various degrees of hardness (Shore A 70 to Shore D 80), without adding external plasticizers, which may be processed into (optionally transparent) films and molded articles having thermoplastically elastomeric properties.

The object of the present invention are blends that contain at least two different vinyl chloride graft copolymers prepared by emulsion polymerization, wherein the at least two different graft copolymers each contain a graft base and a grafted copolymer phase, at least partially consisting of vinyl chloride, characterized in that the graft copolymers differ from each other by their percentage weight distribution of graft base and grafted copolymer phase, and wherein for each of the graft copolymers the glass transition temperature $T_g$ of the graft base is lower than the glass transition temperature $T_g$ of the grafted copolymer phase.

An advantage of the graft copolymers according to the invention is the fact that blends of graft copolymers that contain different percentages of the plasticized graft base can be processed into films and molded articles having different degrees of rigidity. In this way, when employing two graft copolymers with different contents of PBA, the rigidity of molded articles can easily be adjusted in a wide range by varying the mixing ratio. A surprising advantage of the blends according to the invention is the fact that also transparent films and molded articles having different rigidities can be manufactured. This advantage is considerable, since press plates made from a blend of graft copolymers, which actually are transparent, and homopolymeric PVC are opaque.

In a preferred embodiment of the invention, the at least two different graft copolymers independently of each other have a glass transition temperature $T_g$ of the grafted copolymer phase in the range of above 20 to 120° C. and/or a glass transition temperature $T_g$ of the graft base in the range of −80 to 20° C. In a preferred embodiment of the invention, the glass transition temperature $T_g$ of the grafted copolymer phase lies between 40 and 90° C. In a preferred embodiment, the $T_g$ of the graft base lies between −60 and −20° C. The $T_g$'s of the grafted copolymer phase and of the graft base result from the composition of the respectively employed monomers.

In a further preferred embodiment of the invention, a) at least one of the different graft copolymers contains 41 to 70 wt % of graft base and 30 to 59 wt % of grafted copolymer phase, each based on the graft copolymer, and/or b) at least one of the different graft copolymers contains 26 to 40 wt % of graft base and 60 to 74 wt % of grafted copolymer phase, each based on the graft copolymer, and/or c) at least one of the different graft copolymers contains 5 to 25 wt % of graft base and 75 to 95 wt % of grafted copolymer phase, each based on the graft copolymer.

Particularly preferred are those blends that contain:

A) 1 to 99 wt %, based on the blend, of a vinyl chloride graft copolymer A containing 30 to 59 wt %, based on the vinyl chloride graft copolymer A, of a grafted copolymer phase, at least partially prepared from vinyl chloride, having a glass transition temperature $T_g$ in the range of above 20 to 120° C., and 41 to 70 wt %, based on the vinyl chloride graft copolymer A, of a graft base having a glass transition temperature $T_g$ in the range of −80 to 20° C., and/or B) 1 to 99 wt %, based on the blend, of a vinyl chloride graft copolymer B containing 60 to 74 wt %, based on the vinyl chloride graft copolymer B, of a grafted copolymer phase, at least partially prepared from vinyl chloride, having a glass transition temperature $T_g$ in the range of above 20 to 120° C., and 26 to 40 wt %, based on the vinyl chloride graft copolymer B, of a graft base having a glass transition temperature $T_g$ in the range of −80 to 20° C., and/or C) 1 to 99 wt %, based on the blend, of a vinyl chloride graft copolymer C containing 75 to 95% wt %, based on the vinyl chloride graft copolymer C, of a grafted copolymer phase, at least partially prepared from vinyl chloride, having a glass transition temperature $T_g$ in the range of above 20 to 120° C., and 5 to 25 wt %, based on the vinyl chloride graft copolymer C, of a graft base having a glass transition temperature $T_g$ in the range of −80 to 20° C., and D) 0 to 75 wt %, based on the blend, of further ingredients, wherein at least two of the graft copolymers mentioned in A), B) and C) have to be included and wherein the sum of A), B) and C) adds up to at least 25 wt % and the sum of A), B), C) and D) adds up to 100 wt %.

In the scope of the present invention the respective graft base of one or of two or of all of the different vinyl chloride graft copolymers can be prepared by copolymerizing vinyl compounds.

The vinyl chloride graft copolymers are prepared in an emulsion process. In a preferred embodiment, the respective grafted copolymer phase of one or of two or of all of the different vinyl chloride graft copolymers can be prepared from 60 to 100 wt %, preferably from 80 to 100 wt %, of vinyl chloride, and from 0 to 40 wt %, preferably from 0 to 20 wt %, of other polymerizable vinyl compounds.

In another preferred embodiment, the respective graft base of one or of two or of all of the different vinyl chloride graft copolymers is cross-linked and, optionally, the respective grafted copolymer phase of one or of two or of all of the different vinyl chloride graft copolymers is cross-linked.

Moreover, in a systematic study it has been found that the particle size and the cross-linking of the graft copolymer prepared in an emulsion process has a great influence on the transparency of molded articles produced therefrom. By reducing the diameter of the particles of a graft polymerizate, having a cross-linked graft base and a non-cross-linked graft shell or having a cross-linked graft base and a cross-linked graft shell, to below certain values the transparency of a press plate manufactured therefrom will be highly improved.

Thus, blends are also an object of the present invention, which are obtainable by a method comprising the steps:

a) For each of the different vinyl chloride graft copolymers the graft base is prepared by polymerization, wherein by suitably selecting the monomers used the glass transition temperature $T_g$ of the graft base is adjusted, b) Onto each of the graft bases prepared in a), the respective copolymer phase is grafted by emulsion polymerization, thus obtaining the respective vinyl chloride graft copolymer latex, wherein by suitably selecting the monmonomers and, optionally, comonomers used, the glass transition temperature $T_g$ of the respective grafted copolymer phase is adjusted, and wherein by suitably selecting the respective polymerization conditions the average particle size of each of the vinyl chloride graft copolymers is adjusted to below 300 nm, preferably below 200 nm, particularly preferred below 150 nm, and most preferably below 100 nm, c) Separating the respective vinyl chloride graft copolymers as solids from the respective latices, d) Mixing the respective vinyl chloride graft copolymer solids, thus obtaining the blend according to any one of the preceding claims.

An additional object of the present invention is a method for preparing a blend that contains at least two different vinyl chloride graft copolymers prepared by emulsion polymerization, wherein the at least two different graft copolymers each contain a graft base and a grafted copolymer phase, at least partially consisting of vinyl chloride, comprising the steps:

a) For each of the different vinyl chloride graft copolymers a graft base is prepared by polymerization, wherein by suitably selecting the monomers used the glass transition temperature $T_g$ of the graft base is adjusted, and b) Onto each one of the graft bases prepared in a) a copolymer phase is grafted by emulsion polymerization, thus obtaining one each of the vinyl chloride graft copolymer latices, wherein by suitably selecting the monomers used and the optionally used comonomers the glass transition temperature $T_g$ of the respective grafted copolymer phase is adjusted in such a way that the glass transition temperature $T_g$ of the respective graft base is lower than the glass transition temperature $T_g$ of the respective grafted copolymer phase, and wherein by suitably selecting the respective polymerization conditions the average particle size of each of the vinyl chloride graft copolymers is adjusted to below 300 nm, preferably below 200 nm, particularly preferred below 150 nm, and most preferably below 100 nm, and c) Separating the respective vinyl chloride graft copolymers as solids from the respective vinyl chloride graft copolymer latices, and d) Mixing the respective vinyl chloride graft copolymer solids and, optionally, further ingredients, thus obtaining the blend, wherein the different vinyl chloride graft copolymers are prepared in such a way that they differ from each other by their percentage weight distribution of grafted copolymer phase and graft base.

The emulsion polymerization is preferably carried out semi-continuously. In the preparation process of the graft base, water, initiators, monomers, emulsifiers and other additives may be pre-charged into a reactor and partly added in small amounts. In a preferred embodiment, water and the total amount of emulsifier are pre-charged and both the monomers and the initiators are added. The feeding speed of the additives is based upon the conversion speed. The duration of the polymerization is adjusted to one to three hours by the amount of the initiator employed. After the polymerization has ended, the graft base is processed and pre-charged for the preparation of the graft copolymer. Vinyl chloride and, optionally, other polymerizable vinyl compounds are added within 10 min to 180 min. In a preferred embodiment, the amount of VC is divided into a portion to be pre-charged and a portion to be added. In the process, 5 to 20 parts of VC are pre-charged (at once), then polymerized until the pressure drops, and then the addition of the residual amount of VC is started. The temperature is regulated to adjust the desired K-value. In order to promote the polymerization, an initiator is added simultaneously. An emulsifier may be added to increase the stability of the dispersion. The content of solids in the fully polymerized disper-dispersion lies between 20 and 60 wt %, and preferably between 30 and 55 wt %.

Suitable vinyl compounds for the graft base are, for example, acrylic acid esters or methacrylic acid esters (in brief: (meth)acrylic acid esters). Also, butadiene, 2-chlorobutadiene, 1-butene, isoprene, vinylidene chloride, vinyl acetate, vinyl alkyl ether, etc. can be used as vinyl compound.

For the grafting, preferably merely vinyl chloride is used. But it is also possible to homo- or copolymerize (meth) acrylic acid esters which contain 1 to 12 carbon atoms in the alkyl chain of the esterified linear, branched or cyclic alcohol, such as methyl acrylate, ethyl acrylate, propyl acrylate, butyl acrylate, t-butyl acrylate, pentyl acrylate, isopentyl acrylate, cyclohexyl acrylate, ethylhexyl acrylate, methyl methacrylate, ethyl methacrylate, propyl methacrylate, butyl methacrylate, t-butyl methacrylate, pentyl methacrylate, isopentyl methacrylate, ethylhexyl methacrylate, cyclohexyl methacrylate, etc.

In step b) of the method according to the invention the copolymer phase is typically grafted by emulsion polymerization using at least one emulsifier, in which preferably 60 to 100 wt % of the emulsifier amount, based on the total amount of emulsifier, is pre-charged.

The polymerization temperature in the process of preparing each of the graft bases typically lies between 20 and 90° C., preferably between 60 and 85° C.

The polymerization temperature in the process of preparing each of the grafted copolymer phases typically lies between 45 and 90° C., preferably between 55 and 75° C.

Suitable ionic emulsifiers are alkyl sulfonates, aryl sulfonates, alkyl sulfates, alkyl ether sulfates, fatty acid salts, diaryl sulfonates, etc. It is also possible to use non-ionic emulsifiers, such as alkyl ether alcohols having 2 to 20 carbon atoms in the alkyl chain and 1 to 20 ethylene glycol units, fatty alcohols, etc., alone or in combination with ionic emulsifiers. The total amount of emulsifier lies between 0.1 to 5 wt %, based on the amount of monomers employed.

Suitable initiators are water-soluble peroxides, which form radicals by thermal decomposition alone or which can be caused to decompose in combination with a reducing agent and, if necessary, a catalyst. The amount of the initiators employed usually lies, according to experience, between 0.01 and 0.5 wt %, based on the monomers employed.

In a preferred embodiment of the invention, the particle size of the graft copolymer is adjusted to below 300 nm, preferably below 200 nm, particularly preferred below 150 nm, and most preferably below 100 nm, and the graft base is cross-linked by copolymerization with one or more different monomers which contain two or more ethylenically unsaturated double bonds that are not conjugated with each other. Optionally, the grafted copolymer phase may additionally be cross-linked by copolymerization with one or more different monomers containing two or more ethylenically unsaturated double bonds that are not conjugated with each other.

In another preferred embodiment of the invention, a) both the graft base and the graft shell are not being cross-linked, or b) the graft base is not being cross-linked and the graft shell is being cross-linked. Concerning transparency, it is possible in this embodiment of the invention to adjust the particle size of the graft copolymer at will, since it has only minor influence on the transparency of a molded article made therefrom.

Suitable compounds for cross-linking are diallyl phthalate, allyl methacrylate, allyl acrylate, ethylene glycol dimethacrylate, propylene glycol dimethacrylate, butylene glycol diacrylate, trimethylene glycol diacrylate, glycidyl methacrylate, glycidyl acrylate, etc.

In the method according to the invention, a vinyl chloride graft copolymer-containing latex is obtained by way of emulsion polymerization. The solid will be separated either by adding an electrolyte, coagulation and mechanical separation methods such as filtration, decantation, centrifugation of the latex, followed by drying, or by spray drying.

Also an object of the present invention is the processing of vinyl chloride graft copolymer blends according to the invention, which differ from each other in their content of plasticized graft base, into articles and moldings, respectively, having thermoplastically elastomeric properties and, optionally, a good transparency.

Preferred articles according to the invention have a transmittance of at least 65%, preferably of at least 75%, and particularly preferred of at least 85%, and/or a haze value of at most 60, preferably of at most 50, and particularly preferred of at most 40.

Also an object of the invention is the use of the blend according to the invention for adjusting the degree of flexibility of a PVC article, as well as the use of the blends described above for manufacturing an article, preferably for manufacturing films by way of extrusion and/or calendering, or for manufacturing molded articles by way of extrusion or injection molding.

In the following examples the method according to the invention for preparing graft copolymerizates of vinyl chloride having a high transparency will be described.

EXAMPLES

Example 1

Graft Base

Into a 10-liter stirrer reactor with a water-cooled double jacket and equipped with a paddle agitator, 1166 g of deionized water, 68.6 g of butyl acrylate, 3088 g of a 1% solution of potassium myristate and 0.63 g of potassium peroxodisulfate were pre-charged and heated to 80° C. After the reaction had started, addition of 686 g of a 0.3% aqueous potassium peroxodisulfate solution within 180 min was started. Simultaneously, 1990 g of butyl acrylate were added within 180 min. After the addition had ended, the interior reactor temperature was maintained for 60 min and the preparation was cooled down subsequently. 6894 g of dispersion were discharged, having a solid content of 30%, a surface tension of 51.6 mN/m and a pH of 7.6. The average volume-based particle size (PSV) was 12 nm.

Graft Copolymer

Into a 10-liter autoclave with a water-cooled double jacket and a paddle agitator, 124 g of water, 1937 g of a 1% solution of potassium myristate, 3500 g of graft base and 1283 g of vinyl chloride were pre-charged and heated to 68° C. When the polymerization temperature was reached, addition of potassium peroxodisulfate and ascorbic acid was started. The adding speed was adjusted in such a way that the difference between the interior temperature and the supply temperature of the jacket cooling was about 10° C. After the pressure had dropped by 4 bar, the preparation was set to cool and depressurized. The dispersion was discharged. The solid content of the dispersion was 31.3 wt %, the surface tension was 56.6 mN/m, the pH was 8.3. The average volume-based particle size was 68 nm. The preparation was precipitated with calcium chloride and filtered by suction filtration. The residue was dried at 30° C. in a recirculating-air dryer to a residual moisture of <0.3% and finely ground with a centrifugal mill (Retsch ZM 200). The PBA content was determined to be 48.6 wt % by an oxygen analysis.

Example 2

Graft Base

The graft base was prepared following Example 1. 6936 g of dispersion were discharged, having a solid content of 30 wt %, a surface tension of 49 mN/m and a pH of 7.5. The average volume-based particle size was 14 nm.

Graft Copolymer 407 g of water, 2471 g of a 1% potassium myristate solution, 2330 g of graft base and 1633 g of vinyl chloride were pre-charged and polymerized following Example 1. The dispersion was discharged. The solid content of the dispersion was 30.1%, the surface tension was 57.8 mN/m, the pH was 8.8. The average volume-based particle size was 64 nm. The preparation was precipitated with calcium chloride and filtered by suction filtration. The residue was dried at 30° C. in a recirculating-air dryer to a residual moisture of <0.3% and finely ground with a centrifugal mill (Retsch ZM 200). The PBA content was determined to be 34.4 wt % by an oxygen analysis.

Example 3

Graft Base

Into a 10-liter reactor with stirrer, 4156 g of deionized water, 0.4 g of allyl methacrylate, 78 g of butyl acrylate, 705.9 g of potassium myristate (concentration: 5 wt %) and 0.720 g of potassium peroxodisulfate were pre-charged and heated to 80° C. After the reaction had started, addition of 784.3 g of a 0.3% aqueous solution of potassium peroxodisulfate within 180 min was started. Simultaneously, 11.36 g of allyl methacrylate and 2263 g of butyl acrylate were added within 180 min. After the addition had ended, the interior reactor temperature was maintained for 60 min and the preparation was cooled down subsequently. 7911 g of dispersion were obtained. The solid content was 29.8%, the surface tension was 52.2 mN/m and the pH was 7.6. The average volume-based particle size was 12 nm.

Graft Copolymer

Into a 10-liter autoclave with a water-cooled double jacket and a paddle agitator, 1367 g of water, 332 g of a 5% solution of potassium myristate, 3087 g of graft base, 4.32 g of diallyl phthalate and 1076 g of vinyl chloride were pre-charged and heated to 68° C. When the polymerization temperature was reached, the addition of potassium peroxodisulfate and ascorbic acid was started. The adding speed was adjusted in such a way that the difference between the interior temperature and the supply temperature of the jacket cooling was about 10° C. After the pressure had dropped by 4 bar, the preparation was set to cool and de-depressurized. The dispersion was discharged. The solid content was 30.7 wt %, the surface tension was 56.7 mN/m, the pH was 7.7. The average volume-based particle size was 61 nm. The preparation was precipitated with calcium chloride and filtered by suction filtration. The residue was dried at 30° C. in a recirculating-air dryer to a residual moisture of <0.3% and finely ground with a centrifugal mill (Retsch ZM 200). The PBA content was determined to be 46.9 wt % by an oxygen analysis.

Example 4

Graft Base

The graft base of Example 3 was used.

Graft Copolymer

Into a 10-liter autoclave with a water-cooled double jacket and a paddle agitator, 2365 g of water, 387.3 g of a 5% solution of potassium myristate, 2506 g of graft base, 6.347 g of diallyl phthalate and 1580 g of vinyl chloride were pre-charged and heated to 68° C. When the polymerization temperature was reached, the addition of potassium peroxodisulfate and ascorbic acid was started. The adding speed was adjusted in such a way that the difference between the interior temperature and the supply temperature of the jacket cooling was about 10° C. After the pressure had dropped by 4 bar, the preparation was set to cool and depressurized. The dispersion was discharged. The solid content of the dispersion was 30.5 wt %, the surface tension was 58.5 mN/m, the pH was 8.0. The average volume-based particle size was 58 nm. The preparation was precipitated with calcium chloride and filtered by suction filtration. The residue was dried at 30° C. in a recirculating-air dryer to a residual moisture of <0.3% and finely ground with a centrifugal mill (Retsch ZM 200). The PBA content was determined to be 33 wt % by an oxygen analysis.

Example 5

Graft Base

The preparation of Example 3 was repeated. 7909 g of an aqueous dispersion were discharged. The solid content of the dispersion was 30%, the surface tension was 54.4 mN/m, the pH was 7.4. The average volume-based particle size was 12 nm.

Graft Copolymer 3144 g of water, 387.3 g of a 5% potassium myristate solution, 1400 g of graft base, 1906 g of vinyl chloride and 7.63 g of diallyl phthalate were pre-charged and then polymerized following Example 3. The dispersion was discharged. The solid content of the dispersion was 29.6 wt %, the surface tension was 51.9 mN/m, the pH was 8.1. The average volume-based particle size was 56 nm. The preparation was precipitated with calcium chloride and filtered by suction filtration. The residue was dried at 30° C. in a recirculating-air dryer to a residual moisture of <0.3% and finely ground with a centrifugal mill (Retsch ZM 200). The PBA content was determined to be 19.2 wt % by an oxygen analysis.

On a two-roll roller the powdered graft copolymers were processed and pressed into rolled sheets. In the following Table 1, the poly(butyl acrylate) content, the cross-linking, the particle sizes of the graft copolymers and the optical properties (transmittance, haze) are given.

Experimental Procedures:
Measurement of Particle Sizes:

The particle size distributions were measured with a Microtrac Blue-Wave of the S 3500 series by Particle Metrix. The valid measuring range lies between 0.01 and 2000 μm. For the measurement, a standard procedure for dispersions was created, where certain physical properties of the dispersion were given. Before measurement, three drops of Hellmanex® by Hellmanex-Analytics Inc. were added to the deionized water inside the circulation unit, using a disposable 3 ml pipette. The cleanliness of the measurement system was validated by a baseline measurement. Dispersion was added carefully to the sample unit until a loading factor of about 0.004 was reached. Normally, 1 or 2 drops of dispersion are sufficient. The measurement time was 30 s. Evaluation of the measurement is carried out automatically. The average volume-based particle size is used.

Two-Roll Rolling Mill (Including Processing Conditions and Recipe)

In order to determine mechanical values and optical properties, test samples have to be provided. The preparation of the rolled sheets is performed under the following conditions.

| Recipe (spatula blend) |
| --- |
| 100 phr Polymer |
| 1.5 phr BaZn stabilizer (Baerostab UBZ 171) |
| 3.0 phr Epoxydated soy bean oil (Edenol D 81) |
| 0.1 phr Isotridecyl stearate (Loxiol G 40) |
| 0.2 phr High-molecular weight multicomponent ester (Loxiol G 72) |
| 0.1 phr Calcium stearate (Ceasit SW) |

Rolling mill (made by Schwabenthan)
Roller material: chromed surfaces
Roller diameter: 150 mm
Speed ratio: 17/21 1/min
Roller temperature: 140° C.
Rolling time: 5 min
Execution:

In order to form a cohesive mass (sheet) the powder compound is placed onto the roller. After formation of the sheet, the sheet is "cut" and "turned" for 3 min. Then set the thickness of the rolled sheet to 1.1 mm and continue to plasticize the sheet on the roller for further 2 min without cutting and turning. When the specified rolling time is over, the rolled sheet is taken off.

Press
30-ton laboratory press (Werner & Pfleiderer URH 30)
Press area: 350×350 mm
Pressing plates: chromed surfaces
Pressing frame: 220×220×1.0 mm
Execution:

For making the press plates, the previously produced rolled sheets were cut corresponding to the frame size used, inserted into the frame and placed into the laboratory press together with the press plates that form the outer surfaces. The sheets are formed into a press plate under the conditions described below.

| Press temperature: 150° C. | |
| --- | --- |
| LP press power: 30 bar | LP pressing time: 2 min |
| HP press power: 200 bar | HP pressing time: 3 min |
| Removal temperature: 40° C. | |
| Cooling pressure: 200 bar | Cooling time: ca. 8 min |

Transmittance and Haze (Large-Angle Scattering)

In order to evaluate a film's transparency, two values were considered:
  the total transmittance (here: "transmittance"), which stands for the ratio of transmitted light to incident light and which depends on absorption properties and surface conditions
  large-angle scattering (haze), which is a measure for opaqueness.

Measurement:

Measurement of the transmittance and determination of the large-angle scattering of the semi-finished products produced with rollers/presses is carried out with the transparency meter Haze-Gard Dual by Byk-Gardner Inc.

The sample to be measured is illuminated perpendicularly and the transmitted light is photoelectrically measured in an integrating sphere. In this process, the perpendicularly transmitted light is measured in order to evaluate the transmittance, and the light that is scattered in an angle of 2° to the axis of irradiation is measured to evaluate the opaqueness (haze). The measurements are carried out according to ISO 13468, which guarantees that the measurement conditions are the same during calibration as well as during measurement.

TABLE 1

Overview: Test Samples and Press Plates Made Therefrom

| Patent Examples | PBA Content (wt %) | Microtrac MV (nm) | Shore Hardness A | Shore Hardness D | Thickness of Press Plate (mm) | Transmittance, % | Haze | Remarks |
| --- | --- | --- | --- | --- | --- | --- | --- | --- |
| Example 1 | 48.6 | 68 | 88 | 28 | 1.46 | 84.7 | 11.2 | Graft base and graft |
| Example 2 | 34.4 | 64 | | 53 | 1.46 | 77.2 | 36.5 | shell non-cross-linked |
| Example 3 | 46.9 | 61 | 85 | 26 | 1.50 | 84 | 13.2 | Graft base and graft |
| Example 4 | 33 | 58 | 97 | 46 | 1.68 | 80.7 | 6.92 | shell cross-linked |
| Example 5 | 19.2 | 56 | 97 | 59 | 1.74 | 74.8 | 9.08 | and PSV <150 nm |
| Blend Example 1 | 29.6 | | 94 | 59 | 1.67 | 75.4 | 16.4 | 0.75 Example 4 + 0.25 Example 5 |
| Blend Example 2 | 41.5 | | | 41 | 1.56 | 78.4 | 24.4 | 0.50 Example 1 + 0.50 Example 2 |

TABLE 1-continued

Overview: Test Samples and Press Plates Made Therefrom

| Patent Examples | PBA Content (wt %) | Microtrac MV (nm) | Shore Hardness A | Shore Hardness D | Thickness of Press Plate (mm) | Transmittance, % | Haze | Remarks |
|---|---|---|---|---|---|---|---|---|
| Blend Example 3 | 40 | | 92 | 38 | 1.49 | 69.9 | 93.2 | 0.75 Example 3 + 0.25 Example 5 |
| Vinnolit VK 710 | ca. 50 | | 85 | 28 | 1.48 | 78.0 | 65.8 | Competitive product |
| Vinnolit K 707 E | ca. 50 | | 79 | 25 | 1.81 | 53.9 | 68.8 | sample |

Blends consisting of the graft copolymers according to the invention, which differ from each other in their PBA content, show a high transparency. This is a major advantage as compared to blends of a transparent graft copolymer with S-PVC, which are opaque. The press plate of the transparent graft copolymer of Example 3 becomes opaque due to a content of 25 wt % of S-PVC.

The invention claimed is:

1. A polymer blend, comprising:
 a first vinyl chloride graft copolymer prepared using emulsion polymerization and including a graft base having a first glass transition temperature and a grafted copolymer phase including vinyl chloride and having a second glass transition temperature, the first vinyl chloride graft copolymer having a first percentage weight distribution of graft base and grafted copolymer phase; and
 a second vinyl chloride graft copolymer prepared using emulsion polymerization and including the graft base and the grafted copolymer phase, the second vinyl chloride graft copolymer having a second percentage weight distribution of graft base and grafted copolymer phase which is different than the first percentage weight distribution,
 wherein the first and second vinyl chloride graft copolymers have an average particle size below 300 nm.

2. The polymer blend of claim 1, wherein the first glass transition temperature is from about −80° C. to about 20° C.

3. The polymer blend of claim 2, wherein the second glass transition temperature is from about 20° C. to about 120° C.

4. The polymer blend of claim 1, wherein the first vinyl chloride graft copolymer includes:
 the graft base in an amount from about 41 wt. % to about 70 wt. % by weight of the first vinyl chloride graft copolymer and the grafted copolymer phase in an amount from about 30 wt. % to about 59 wt. % by weight of the first vinyl chloride graft copolymer.

5. The polymer blend of claim 1, wherein the first vinyl chloride graft copolymer includes:
 the graft base in an amount from about 26 wt. % to about 40 wt. % by weight of the first vinyl chloride graft copolymer and the grafted copolymer phase in an amount from about 60 wt. % to about 74 wt. % by weight of the first vinyl chloride graft copolymer.

6. The polymer blend of claim 1, wherein the first vinyl chloride graft copolymer includes:
 the graft base in an amount from about 5 wt. % to about 25 wt. % by weight of the first vinyl chloride graft copolymer and the grafted copolymer phase in an amount from about 75 wt. % to about 95 wt. % by weight of the first vinyl chloride graft copolymer.

7. The polymer blend of claim 1, wherein the first and second vinyl chloride graft copolymers are selected from the group consisting of:
 vinyl chloride graft copolymer A including the graft base in an amount from about 41 wt. % to about 70 wt. % by weight of the vinyl chloride graft copolymer A and the grafted copolymer phase in an amount from about 30 wt. % to about 59 wt. % by weight of the vinyl chloride graft copolymer A;
 vinyl chloride graft copolymer B including the graft base in an amount from about 26 wt. % to about 40 wt. % by weight of the vinyl chloride graft copolymer B and the grafted copolymer phase in an amount from about 60 wt. % to about 74 wt. % by weight of the vinyl chloride graft copolymer B; and
 vinyl chloride graft copolymer C including the graft base in an amount from about 5 wt. % to about 25 wt. % by weight of the vinyl chloride graft copolymer C and the grafted copolymer phase in an amount from about 75 wt. % to about 95 wt. % by weight of the vinyl chloride graft copolymer C.

8. The polymer blend of claim 7 and further comprising:
 from about 0 to about 75 wt. % additional ingredients by weight of the polymer blend; and
 optionally, a third vinyl chloride graft copolymer prepared using emulsion polymerization and including the graft base and the grafted copolymer phase, the third vinyl chloride graft copolymer having a third percentage weight distribution of graft base and grafted copolymer phase which is different than the first and second percentage weight distributions,
 wherein the first, second and optional third vinyl chloride graft copolymers are selected from the group consisting of:
 the vinyl chloride graft copolymer A, present in an amount from about 1.0 wt. % to about 99 wt. % by weight of the polymer blend;
 the vinyl chloride graft copolymer B present in an amount from about 1.0 wt. % to about 99 wt. % by weight of the polymer blend; and
 the vinyl chloride graft copolymer C present in an amount from about 1.0 wt. % to about 99 wt. % by weight of the polymer blend,
 wherein the grafted copolymer phase has a glass transition temperature from about 20° C. to about 120° C., and the graft base has a glass transition temperature from about −80° C. to about 20° C., and
 wherein the sum of the vinyl chloride graft copolymer, the second vinyl chloride graft copolymer, the optional third vinyl chloride graft copolymer and the additional ingredients adds up to 100 wt. %.

9. The polymer blend of claim 1, wherein the graft base is prepared by copolymerizing vinyl compounds.

10. The polymer blend of claim 1, wherein the grafted copolymer phase of the first vinyl chloride graft copolymer includes about 60 wt. % to about 100 wt. % vinyl chloride by weight of the grafted copolymer phase and from about 0 wt. % to about 40 wt. % by weight of the grafted copolymer phase other vinyl compounds.

11. The polymer blend of claim 1, wherein the graft base of the first vinyl chloride graft copolymer is cross-linked.

12. The polymer blend of claim 1, wherein the grafted copolymer phase of the first vinyl chloride graft copolymer is cross-linked.

13. The polymer blend of claim 1, wherein the polymer blend has a transmittance of at least 65% as measured according to ISO 13468 for a plate having a thickness from 1.46 mm to 1.74 mm.

14. The polymer blend of claim 1, wherein the polymer blend has a haze value of less than 60 as measured according to ISO 13468 for a plate having a thickness from 1.46 mm to 1.74 mm.

15. A method of forming a polymer blend, the method comprising:
    forming a first vinyl chloride graft copolymer solid having an average particle size below 300 nm by
        polymerizing a graft base having a first glass transition temperature; and
        grafting a copolymer phase including vinyl chloride and having a second glass transition temperature onto the graft base using emulsion polymerization;
    forming a second vinyl chloride graft copolymer solid having an average particle size below 300 nm by polymerizing the graft base; and
        grafting the copolymer phase onto the graft base using emulsion polymerization; and
    mixing the first and second vinyl chloride graft copolymer solids to form the polymer blend, wherein the first and second vinyl chloride graft copolymer solids differ from each other by their percentage weight distribution of grafted copolymer phase and graft base.

16. The method of claim 15, wherein forming the first and second vinyl chloride graft copolymers includes grafting the copolymer phase onto the graft base by emulsion polymerization using at least one emulsifier.

17. The method of claim 15, wherein a polymerization temperature for the graft base is from about 20° C. to about 90° C.

18. The method of claim 15, wherein a grafting polymerization temperature for the grafted copolymer phase is from about 45° C. to about 90° C.

19. The method of claim 15, wherein the polymer blend has a transmittance of at least 65% as measured according to ISO 13468 for a plate having a thickness from 1.46 mm to 1.74 mm.

20. The method of claim 15, wherein the polymer blend has a haze value less than 60 as measured according to ISO 13468 for a plate having a thickness from 1.46 mm to 1.74 mm.

* * * * *